United States Patent

[11] 3,617,714

[72] Inventors Brian W. Kernighan
North Plainfield;
Shen Lin, Gillette, both of N.J.

[21] Appl. No. 816,208
[22] Filed Apr. 15, 1969
[45] Patented Nov. 2, 1971
[73] Assignee Bell Telephone Laboratories Incorporated
Murray Hill, Berkeley Heights, N.J.

[54] METHOD OF MINIMIZING THE INTERCONNECTION COST OF LINKED OBJECTS
9 Claims, 13 Drawing Figs.

[52] U.S. Cl. .......... 235/150
[51] Int. Cl. .......... G06f 9/06
[50] Field of Search .......... 235/150

[56] References Cited
OTHER REFERENCES

" Electrical Assemblies with a Minimum Number of Interconnections"; IRE Transactions on Electronic Computers pp. 86–88; Feb. 1962

*Primary Examiner*—Malcolm A. Morrison
*Assistant Examiner*—Edward J. Wise
*Attorneys*—R. J. Guenther and William L. Keefauver

ABSTRACT: A method of partitioning the vertices of a graph into sets is disclosed. The method, desirably practiced by using a digital computer program, minimizes the total cost of interconnections between sets using constraints on the maximum number of sets, the maximum number of vertices that can be assigned to any particular set, and the maximum number of connections which can be made to any one set. The method is particularly useful in the layout of circuit components on physical supports such as chassis, printed circuit cards, and semiconductor substrates.

INVENTORS B. W. KERNIGHAN
S. LIN
BY R. O. Nimtz
ATTORNEY

METHOD OF MINIMIZING THE INTERCONNECTION COST OF LINKED OBJECTS

FIELD OF THE INVENTION

The invention relates to methods of partitioning elements into sets in such a manner that a particular measure of the adequacy of the partition is satisfied.

BACKGROUND OF THE INVENTION

The design of modern complex electronic systems is complicated by the fact that in addition to problems of component and circuit design caused by the operational requirements, problems concerning the physical layout of the components must be considered. The circuit elements must be placed on physical supports such as chassis, printed circuit cards, or semiconductor substrates, and each of these structures has a fixed number of elements that it can hold and a fixed number of terminals by which it can be connected to the other supporting structures. In addition, practical problems often impose other constraints which must be satisfied. For example, electrical or mechanical considerations may dictate that a particular set of components be on the same structure or that certain components not be on the same structure.

In a large system, and especially in a large system that is to be mass produced, it is important that the component layout problem not only be solved, but be solved efficiently. Since it is both easier and cheaper to connect components on the same structure than it is to connect components on different structures, the optimum solution should minimize the interconnections required between supporting structures.

A further constraint on the problem solution is that it must not only provide an efficient solution but must itself be efficient. That is, in view of the growing complexity of electronic systems, the method of solving the problem must be such that it can be done easily and rapidly. This implies that the method may not be overly dependent upon either the number of components to be assigned or the number of supporting structures available.

Accordingly, it is an object of this invention to provide a method of assigning components to supporting structures so as to minimize the cost of connections between structures.

It is a more specific object of this invention to provide a method of assigning components to supporting structures which may be suitably performed by an appropriately programmed digital computer.

It is a still more specific object of this invention that the digital computer program used to perform the method be such that its running time be approximately a function of the square of the number of components to be assigned.

SUMMARY OF THE INVENTION

In accordance with the present invention, these objects are achieved through the use of a cost matrix which defines the cost of connecting a particular component to each of the other components.

The method starts by using the cost matrix to compute, for any arbitrary partition of the components, the total cost of the connections between the sets of the partition, where each set represents a supporting structure. The method then tries to decrease the total interconnection cost by a series of interchanges of particular subsets within each set. When no further improvements are possible, the resulting partition is stored and the process may be repeated with a different initial partition. Each resulting partition is optimum or nearly optimum, and any particular one may be used to assign the components to supporting structures.

DETAILED DESCRIPTION

Figure 1A:
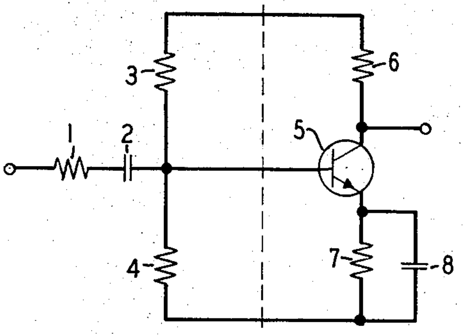
FIGS. 1A, 1B are used to illustrate the improvement in the arrangement of a simple circuit that can be obtained through the use of the novel process.

The invention can be best understood by a consideration of the abstract mathematical model which is inherent in the circuit layout problem. This mathematical model involves the concepts of "set" and "graph." These terms are well known in the art, as can be seen, for example, in the text The Theory of Graphs, by Claude Berge, translated by Alison Doig, published by Methmen & Company, Ltd., London, 1966. Page 1 defines "set." "A set is a collection of objects of any nature whatsoever, which are called its points (or its elements)." Page 5 defines "graph." "We say that we have a 'graph' whenever we have: (1) a set X; (2) a function Γ mapping X into X. Strictly speaking, a graph, which is denoted by $G=(X,\Gamma)$, is the pair consisting of the set X and the function Γ. The parenthood relationships amongst a group of people define a graph, as do the rules of chess, the connections between several pieces of electrical apparatus.

Circuit components may thus be considered to be the vertices of a graph. The connections between components may be termed "edges." Each edge may have a value assigned to it that corresponds to the cost of connecting the two vertices at the ends of the edge. The mathematical problem, then, is to partition the vertices of the graph into sets such that the interconnection cost is minimized, where the interconnection cost is defined as the sum of the values on all those edges which connect vertices in different sets of the partition.

The simplest mathematical partitioning problem which still contains all the significant features of the general problem is that of finding a minimal-cost partition of a graph having $2n$ vertices into two sets each having $n$ vertices. This will be called a two-way partition and its solution will provide the basis for the solution of the more general problem.

Let S represent a universe comprised of $2n$ points with an associated cost matrix, $d_{ij}$, with $i=1,2, ..., 2n$ and $j=1,2, ..., 2n$. Each entry in the matrix represents the connection cost of the two corresponding elements. For example, the entry $d_{ab}$ represents the cost of connecting component $a$ to component $b$. The matrix will be symmetric since the cost of connecting component $a$ to component $b$ is the same as the cost of connecting component $b$ to component $a$, that is, the interconnection cost is nondirectional. If, in a particular application, these costs are different, both of the appropriate entries in the cost matrix should be set equal to the average of the two costs, thus forcing the cost matrix to be symmetric. S must be partitioned into two sets A and B, each containing $n$ points, such that the interconnection cost $$C=\sum_{\substack{a\epsilon A\\ b\epsilon B}} d_{ab} \qquad (1)$$

is minimized.

Given S and $d_{ij}$ there exists a minimum cost two-way partition which may be denoted A*, B*. Let A, B be any arbitrary partition. Then there are subsets $X\subset A$ and $Y\subset B$ with $$|X|=|Y|\leq\frac{n}{2} \qquad (2)$$

such that interchanging X and Y produces A* and B*. That is $$A^*=A-X+y \qquad (3)$$

$$B^*=B-Y+X$$

The problem is now seen to comprise identifying X and Y without considering all possible choices.

To accomplish this identification, several definitions are required. An external cost $E_a$ is defined for each $a \epsilon A$ by $$E_a=\sum_{y \epsilon B} d_{ay} \qquad (4)$$

and an internal cost $I_a$ by $$I_a=\sum_{x \epsilon A} d_{ax} \qquad (5)$$

Equation (4) defines the total cost of connecting each $a \epsilon A$ with each element of B, while equation (5) defines the total cost of connecting each $a \epsilon A$ to every other element of A. $E_b$ and $I_b$ are similarly defined for each $b \epsilon B$.

Next $D_z$, the difference between the external and internal costs of element $z$, is defined for every element in S.

$$D_z=E_z-I_z \qquad (6).$$

Finally, if any $a \epsilon A$ and any $b \epsilon B$ are interchanged, the reduction in the interconnection cost, denoted the gain, $g$, is seen to be given by equation (7)

$$g=D_a+D_b-2d_{ab} \qquad (7).$$

This can be shown by letting T be the total external cost due to all vertices except $a$ and $b$. Then $$\text{old cost}=T+E_a+E_b-d_{ab} \qquad (8)$$

Note that both $E_a$ and $E_b$ contain the term $d_{ab}$ and one of these must be subtracted by the fourth term in equation (8) to give the correct result. When $a$ and $b$ are interchanged their internal costs become external costs, and vice versa. Thus after the interchange the cost is $$\text{new cost}=T+I_a+I_b+d_{ab} \qquad (9)$$

The gain is given by $$\text{gain} = \text{old cost} - \text{new cost}$$
$$= D_a+D_b-2d_{ab} \qquad (10)$$

The identification of subsets X and Y proceeds by first using the cost matrix to compute the difference value, D, for each element in S as shown in equation (6). As indicated by equations (4) and (5), the external and internal costs required to compute D may be obtained for each element by summing the appropriate entries in that element's row or column in the cost matrix $d$. Either rows or columns may be used since $d$ is a symmetric matrix.

The D values are then scanned to select the pair of elements, one in set A and one in set B, whose interchange will produce the largest gain, that is, the largest reduction in interconnection cost. To aid in this selection, the D values of each set are sorted into decreasing order as shown in equations 11.

$$D_{a_1} \geq D_{a_2} \geq \ . \ . \ . \ \geq D_{a_n}$$
$$D_{b_1} \geq D_{b_2} \geq \ . \ . \ . \ \geq D_{b_n} \qquad (11)$$

The gain that would be produced by interchanging elements $a_1$ and $b_1$ is computed using equation (7). Then the value of gain for elements $a_1$ and $b_2$ is computed, compared with the previous gain, and the larger value is selected. This process is repeated until a pair $D_{a_i}$, $D_{b_j}$ is found whose sum is less than or equal to the beat gain previously found, at which point pairs $D_{a_k}$, $D_{b_l}$ with $k>i$ and $l \geq j$ need not be considered. This is true since the third term in equation (7) can only serve to decrease the sum $D_{a_i}+D_{b_j}$, and since the D values have been sorted, there cannot be another pair $(a_k, b_l)$ with $K \geqslant i$, and $l \geqslant j$ which has a greater sum of D values.

When the appropriate pair of elements, for example, $(a_1', b_1')$ with gain $g_1$, have been identified, $a_1'$ a is treated as a member of set B and $b_1'$ is treated as a member of set A. The D values $D_x'$ and $D_y'$, for the new sets $A-a_1'$ and $B-]b_1'$ are computed by $$D_x'=D_x+2d_{xa}-2d_{xb} \quad x \epsilon A-a_z'$$
$$D_y'=D_y+2d_{yb}-2d_{ya} \quad y \epsilon B-b_1' \qquad (12)$$

The correctness of these expressions is easily verified by considering $D_x'$. The connection $(x, a_1')$ is counted as internal in $D_x$ and it is to be external in $D_x'$, so $d_{xa}$ must be added twice to make this correct. Similarly, $d_{xb}$ must be subtracted twice to convert it from external to internal. Analogous reasoning applies to the computation of $D_y'$.

A new pair of elements, $(a_2', b_2')$, is now chosen from sets $A-a_1'$, $B-b_1'$ such that $$g_2=D_{a'_2}+D_{b'_2}-2d_{a'_2 b'_2} \qquad (13)$$

is maximal, in the same manner as the pair $a_1'$, $b_1'$ was chosen. It is important to note that $a_1'$ and $b_1'$ are not considered in the choice of $a_2'$ and $b_2'$. The gain $g_2$ will thus be the additional gain that results when $a_2'$ and $b_2'$ are exchanged as well as $a_1'$ and $b_1'$.

The process continues by identifying $(a_3', b_3')$, ..., $(a_n', b_n')$, and the corresponding maximum gains $g_3$, ..., $g_n$. As each pair, $(a', b')$, is identified, it is removed from contention for further choices, so the size of the sets being considered decreases by 1 each time a pair is selected. Of course, $$\sum_{i=1}^{n} g_i=0 \qquad (14)$$

since this corresponds to completely interchanging sets A and B. Equation (14) indicates that some of the $g_i$ will be negative unless all are zero.

The last step in the identification of the sets $X=(a_1', a_2', ..., a_k')$ and $Y=(b_1', b_2', ..., b_k')$ to be interchanged is to inspect the gains, $g_i$, that have been computed. Since each value $g_i$ represents an additional gain obtained by interchanging a particular pair, the sets $X$ and $Y$ are identified by choosing $k$ such that $$\sum_{i=1}^{k} g_i=G \qquad (15)$$

is maximal. Obviously, if G is greater than zero, interchanging subsets X and Y will decrease the interconnection cost.

The result of interchanging sets X and Y is a new partition. This new partition may now be treated as the initial partition and the process repeated. When the iteration of the process results in a value of G that is less than or equal to zero, a locally optimum partition has been achieved. "Locally optimum" here means optimum with respect to both the initial partition and the process which has been described.

Experimentation has shown that the locally optimum partition will often be the globally optimum partition, that is, the partition of the elements actually having the lowest cost of interconnection. This is to be expected from the nature of the process. First, since the maximum partial sum of the sequence of gains $g_i$, $i=1$, ..., $n$, is used, the process does not terminate immediately when a negative value of $g_i$ is encountered. This means that the process can identify subsets for which the interchange of a few elements would actually increase the cost, while the interchange of the entire subsets produces a net gain. Permitting such a temporary increase in cost is an effective way to keep from being trapped at a local minima. Much of the power of the process comes from this feature.

A simple example of the operation of the locally optimum process may aid in understanding the invention. FIG. 1A is a schematic diagram of a well-known circuit, an RC-coupled transistor amplifier comprising eight components. Assume that these eight components must be placed on two circuit boards, each of which is capable of holding four components. Further, assume that the cost of connecting any two components is 1. The cost matrix, $d$, will thus be as shown in table 1.

TABLE 1

| ... | 1 | 2 | 3 | 4 | 5 | 6 | 7 | 8 |
|---|---|---|---|---|---|---|---|---|
| 1 | 0 | 1 | 0 | 0 | 0 | 0 | 0 | 0 |
| 2 | 1 | 0 | 1 | 1 | 1 | 0 | 0 | 0 |
| 3 | 0 | 1 | 0 | 1 | 1 | 1 | 0 | 0 |
| 4 | 0 | 1 | 1 | 0 | 1 | 0 | 1 | 1 |
| 5 | 0 | 1 | 1 | 1 | 0 | 1 | 1 | 1 |
| 6 | 0 | 0 | 1 | 0 | 1 | 0 | 0 | 0 |
| 7 | 0 | 0 | 0 | 1 | 1 | 0 | 0 | 1 |
| 8 | 0 | 0 | 0 | 1 | 1 | 0 | 1 | 0 |

An obvious way to lay out the circuit would be to break it up as shown by the dotted line in FIG. 1A and put components 1–4 on one board and components 5–8 on the other. This will be taken as the initial partition, that is, set A will contain components 1–4 and set B will contain components 5–8.

The first step in the process would be the computation and sorting of the D values for sets A and B using equation (6). This would result in the values shown in table 2.

TABLE 2

Set A $$D_4=+1,\ D_3=0,\ D_1=-1,\ D_2=-2$$

Set B $$D_5=0,\ D_6=0,\ D_7=-1,\ D_8=-1$$

The values in table 2 would next be scanned to select the pair of elements whose interchange would produce the best gain. Using equation (7) the gain that would be obtained by interchanging elements 4 and 5 is seen to be −1. Elements 4 and 6 would next be tried with the result of a gain of +1. The scanning would halt at this point since the sum of the next pair of D values, $D_4+D_7$, is less than the best gain previously found.

Elements 4 and 6 would thus be set aside and the D values of the remaining elements would be recomputed using equations (12), and sorted, with the result as shown below in table 3.

TABLE 3

Set A $$D_3=0,\ D_2=0,\ D_1=-1$$

SET B $$D_5=0,\ D_7=-3,\ D_8=-3$$

The D values of table 3 would again be scanned with the result that the best gain would be found to be −1, which could be obtained by the exchange of elements 1 and 5.

Elements 1 and 5 would be set aside and the D values again recomputed and sorted, with the result shown in table 4.

TABLE 4

Set A $$D_2=0,\ D_3=-2$$

Set B $$D_7=-1,\ D_8=-1$$

The best gain that could be found by scanning these D values is −1 obtained by interchanging elements 2 and 7. These would be set aside and the gain found by exchanging the remaining two elements, 3 and 8, would then be found to be +1.

The sequence of gains generated would thus be

1, −1, −1, 1 so the sequence of partial sums would be 1, 0, −1, 0.

The maximum gain that could be achieved, +1, would thus be seen to be obtainable by interchanging the first pair selected, elements 4 and 6.

At this point the process would actually interchange elements 4 and 6 and then begin again with a computation of the D values. This second iteration of the process, which would proceed in the same manner as the first iteration which has been described in detail, would result in the sequence of gains:

−1, −1, −1, 3 and the corresponding partial sum sequence:

−1, −2, −3, 0.

This would indicate that no further interchange could achieve a positive gain, and so the process would terminate with the partition:

Set A = 1, 2, 3, 6
Set B = 4, 5, 7, 8

Figure 1B:
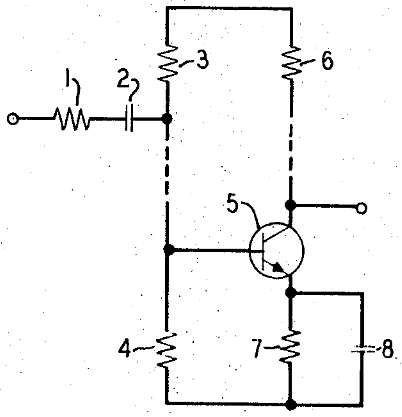

This indicates that the circuit of FIG. 1A should be partitioned as shown in FIG. 1B, resulting in the need for one less interconnection than the original partition. This example illustrates another important advantage of the invention over performing the circuit layout by hand. The process is not affected by partitions that appear to be optimum due to the manner in which the schematic diagram is drawn.

In the simple example just shown, any initial partition would have resulted in the same optimum partition. However, in general, different initial partitions will result in different locally optimum partitions.

If a particular set of elements has a clearly optimum partition, the result obtained from most initial partitions will be that optimum partition. In general, a set of elements will have several optimum or nearly optimum partitions, and once these have been ascertained through the use of the above process a particular one of them may be chosen, possibly subject to criteria that are not easily expressible mathematically.

The process does not guarantee that the optimum partition, termed globally optimum, will be found. Hence, in some cases there may be a desire to improve the locally optimum partition, and this may be easily done in several ways, two of which will be described in detail.

The basic method of improvement is to perturb the locally optimum partition, in what is hopefully an enlightened manner, so that an iteration of the process on the perturbed solution will yield a further reduction in cost.

The methods of improvement are based on the fact that if the locally optimum partition is not also globally optimum, then there exist subsets $X \subset A$, and $Y \subset B$ with $$|X|=|Y|=k\leq\frac{n}{2} \qquad (16)$$

such that interchanging X and Y produces A* and B* with a positive gain G.

Experimental results have suggested that in those cases in which the locally optimal solution is not also globally optimal, $$|X|=|Y|\approx\frac{n}{2} \qquad (17)$$

This implies that if |X| and |Y| had been small compared to $n/2$ they would have been identified by the process; it is only larger subsets which are not identified all the time.

The first method of identifying X and Y is to perform the locally optimum process separately on each of the sets A and B by dividing each into two subsets, say $$A \rightarrow (A_1, A_2)$$
$$B \rightarrow (B_1, B_2) \qquad (18)$$

and finding the locally optimum partitions. Then the four subsets are recombined into two sets in either of the ways shown in equations (19) and (20).

$$A_0=A_1 \cup B_1$$
$$B_0=A_2 \cup B_2 \qquad (19)$$
$$A_0=A_1 \cup B_2$$
$$B_0=A_2 \cup B_1 \qquad (120)$$

After recombination the process is again performed. Experiments have shown this to be generally effective if the recombination is performed either as in equation (19) or equation (20).

The second method for improving the locally optimum partition involves a more direct identification of the subsets $X \subset A$ and $Y \subset B$ which must be interchanged to convert A and B into the optimal A* and B*. This method is of greatest use for larger problems where the subsets X and Y are large, but not as large as $n/2$.

As the locally optimum process is performed, one element in the sequence of partial sums shown in equation (21) is formed for each cycle.

$$G_i=\sum_{j=1}^{i} g_i=g_1+g_2+\ \ldots\ +g_i \qquad (21)$$

Figure 2A:
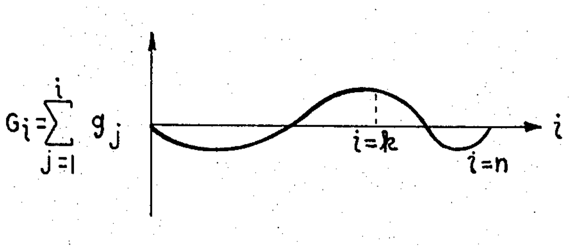
FIGS. 2A, 2B, and 2C show a graphical representation of a particular step in the novel process.
Figure 2B:
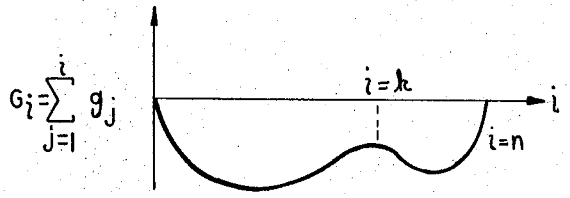

If this is ever positive, then the process chooses a maximal value and continues. If no $G_i$ is positive then the process terminates. This is shown in FIGS. 2A and 2B. When the result of the process is as shown in FIG. 2A, the point $i=k$ will identify the subsets to be interchanged. However, the process would terminate without performing an interchange in the example of FIG. 2B. It is intuitively clear that if a sequence of $G_i$'s has a local maximum which is less than or equal to zero, as shown in FIG. 2B, then the subsets $(a_1', ..., a_k')$ and $(b_k', ..., b_k')$ are at least plausible candidates for interchange.

This second method is performed by scanning down the list of $G_i$'s to find a peak, interchanging the two corresponding subsets, and repeating the locally optimum process. It is true that interchanging the two corresponding subsets, and repeating the locally optimum process. It is true that interchanging these two subsets temporarily increases the interconnection cost. However, it has been found that the interchange will often perturb the partition sufficiently so as to permit the next pass of the locally optimum process to make a reduction. If the process results in a return to the same point, no further improvement will be made.

Figure 2C:
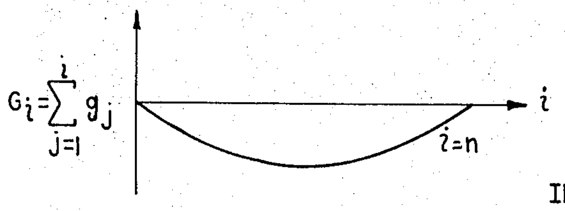

In the case where the curve of the $G_i$'s is unimodal, as shown in FIG. 2C, the current partition has a very good chance of being globally optimum and no further interchange would be performed.

The basic locally optimum process may easily be extended to more general partitions. For example, it may be desired to partition a universe S containing $n$ elements into two sets such that there are at least $n_0$ elements and at most $n_1$ elements in either set. The process may be used to handle this constraint by the addition of "dummy" elements. These are elements that have no connections whatsoever; that is, they have zero entries in the cost matrix wherever they appear. The size of S is increased to $2n_1$ elements by the addition of $2n_1-n$ dummies, and the locally optimum process is performed. The resulting partition will assign the dummy elements to the two sets of S so as to minimize the external cost. The dummies are then discarded leaving a partition into two sets that satisfy the given size constraints.

The basic locally process can also be used to partition graphs having unequally sized vertices. This situation arises physically when a particular component occupies a greater than normal amount of space on the supporting structure. This may be easily handled by converting any node of size $k>l$ to a cluster of $k$ nodes of size 1, bound together with edges of arbitrarily high cost.

Finally, the basic process of performing a two-way partition on a set of $2n$ elements may be extended to the more general technique of performing $k$-way partitions on a universe of $kn$ objects.

The essence of this extension of the locally optimum process is to start with a partition into $k$ sets of size $n$ and, by repeated application of the locally optimum process to pairs of sets, make the partition as close as possible to being pairwise optimal. Of course pairwise optimally is only a necessary condition for gobal optimality, but it has been found to be an effective approximation in most cases. There may be situations where some complex interchange of three or more elements from three or more sets is required to reduce a pairwise optimal solution to globally optimum, but at the present time no reasonable method of identifying such elements is known.

There are three basic methods for finding good multiway starting partitions of $kn$ elements into $k$ sets of size $n$. The simplest method is to arbitrarily divide the elements into $k$ sets and repeatedly apply the locally optimum process to pairs of the sets.

The second method is to form an $r$-way partition, then an $s$-way partition on each of the resulting subsets, and so on, up to $t$-way, where $k=rs...t$ (22) The locally optimum process is applied to each pair of sets existing at each stage of the partition. For example, if $k$ is a power of two, the elements are split in half and the process is performed. Then each half is again split and the process is applied to the four resulting sets. This is continued until the desired set size is reached.

A third method is to partition the set of $kn$ elements into a set of $n$ and a set of $(k-l)n$, and perform the locally optimum process. Next, $n$ elements from the remaining $(k-l)n$ are identified. This continues until $k$ sets have been formed, at which time the locally optimum process is performed on pairs of sets to improve the partition.

The introduction of dummy elements has been mentioned as a method of handling partitioning into sets of unequal sizes. This can be viewed equally well as a method of introducing "-slack" into a solution, in an attempt to get a lower overall interconnection cost by allowing "expansion." The problem discussed up to this point has required the finding of a partition with a constraint on both the size of the sets and on the number of sets since, given $kn$ elements, the best partition into exactly $k$ sets each containing $n$ elements has been sought. The constraint on the number of sets may be relaxed by permitting the addition of dummy elements to expand the size of the problem, and attempting to find the best solution involving any number, greater than or equal to $k$, of sets each containing at most $n$ elements. The expansion yielding a partition having the lowest interconnection cost may be termed the "optimum expansion." In general, the optimum expansion will require more sets but will have a lower interconnection cost. This corresponds, in the circuit layout problem, to decreasing the number of interconnections between supporting structures by increasing the number of structures used.

Figure 3:
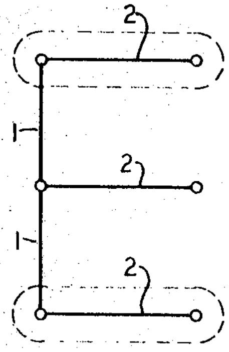
FIG. 3 is a graphical representation of an extension of the novel process.

FIG. 3 shows an example in which introducing slack permits a lower overall interconnection cost. The vertical edges have cost 1 and the horizontal edges have cost 2. Any partition into two sets each having three elements has a total interconnection cost of at least three, but the obvious partition into three subsets, shown by the broken lines, has a cost of only two. Any nontrivial partition into four or more sets has a cost greater than two, so the partition into three sets represents the optimal expansion.

The locally optimum process is used to find the minimal cost solution and the corresponding optimum expansion as follows. Suppose the problem has $kn$ elements to be partitioned into $k$ sets of $n$ points each. Starting with no slack ($kn$ points), the locally optimum assignment is found by the basic process described above. Then $n$ dummies, enough to create one extra set, are added, making a $(k+l)$ $n$ problem to which the process is applied. When the process results in the production of a set which is entirely dummies, the optimum solution is the partition with this set of dummies removed.

The locally optimum process comprising this invention is described by the digital computer program listing shown in pages A1 through A10 of the Appendix. This program listing, written in FORTRAN IV, is a description of the set of electrical control signals that serve to reconfigure a suitable general purpose digital computer into a novel machine capable of performing the invention. The steps performed by the novel machine on these electrical control signals in the general purpose digital computer comprise the best mode contemplated to carry out the invention.

A general purpose digital computer suitable for being transformed into the novel machine needed to perform the novel process of this invention is an IBM System 360 Model 65 computer equipped with the OS/360 FORTRAN IV compiler as described in the IBM manual. IBM System /360 FORTRAN IV Language—Form C28-6515. Another example is the GE-635 computer equipped with the GECOS FORTRAN IV complier as described in the GE 625/635FORTRAN IV Reference Manual, CPB-1006E.

The program listing in the appendix comprises only the locally optimum process as disclosed in equations (1) through (15) and the accompanying text. As has been previously explained, the locally optimum process which performs a two-way partition is easily extendible to $k$-way partitioning. The program statements required to implement any of the variations of the locally optimum process which have been discussed will be readily apparent to those skilled in the art.

The program listing, which has been extensively commented, is more readily understood with the aid of the flow charts of FIGS. 4–8. The flow charts can be seen to include four different symbols. The oval symbols are terminal indicators and signify the beginning and end of a particular subroutine. The rectangles, termed "operation blocks," contain the description of a particular detailed operational step of the process. The diamond-shaped symbols, termed "conditional branch points," contain a description of a test performed by the computer to enable it to choose the next step to be performed. The circles are used merely as a drawing aid to prevent overlapping lines.

Page A1 of the appendix shows the statements, well known to those skilled in the art, that are required to reserve space in memory for the various values used in the performance of the process, as well as those generated by the process. These statements are a required part of those portions of the program using this storage.

The program comprises five subroutines: OPT; DVALUE; SELECT; SORT; and UPDATE.

Figure 4:
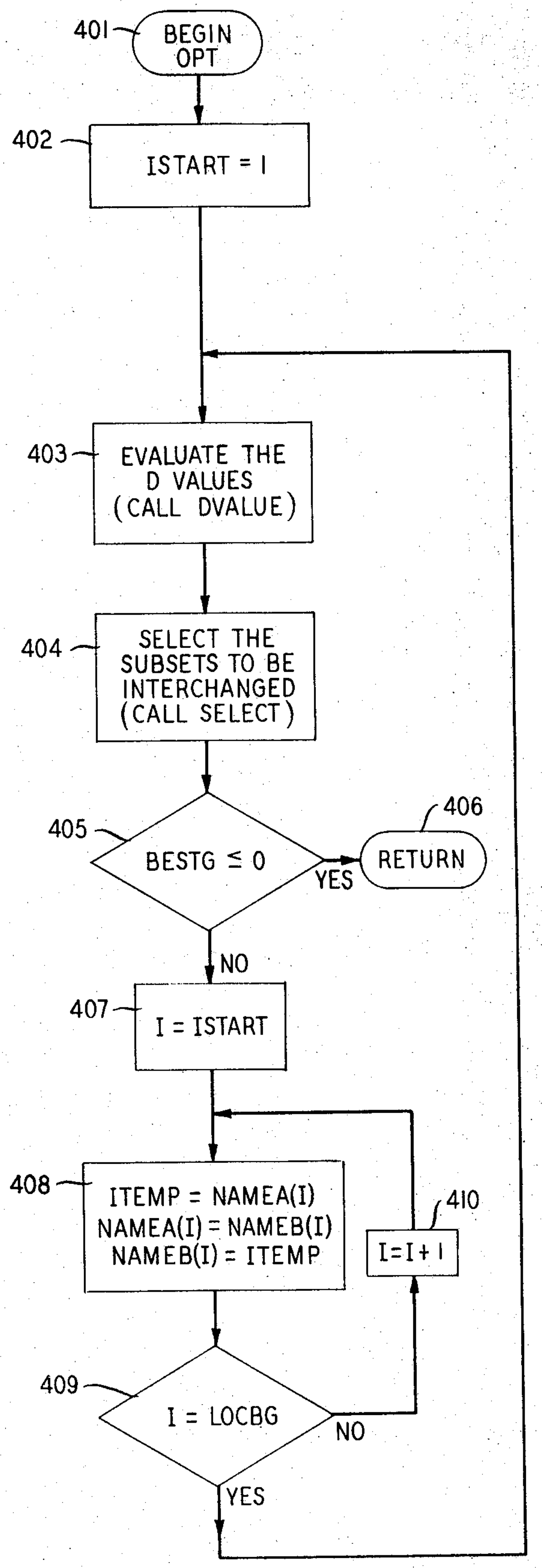
FIG. 4 is a flow chart of subroutine OPT which illustrates a particular sequence of steps of the novel process.

The first subroutine, OPT, is shown in the flow chart of FIG. 4 and on pages A1 and A2 of the Appendix. OPT has been written as a subroutine to allow the locally optimum process to be imbedded in another program; however, OPT is actually the main routine with respect to the process itself.

OPT begins, as shown in FIG. 4, at terminal 401. The first operation 402 serves to initialize the operational loop 407–410. Block 403 calls subroutine DVALUE which computes the D values for the current partition in the manner described below. Block 404 selects the subsets which should be interchanged by calling subroutine SELECT. Conditional branch point 405 tests the best gain, BESTG, found by SELECT. If BESTG is negative or zero, the current partition is locally optimum and the process ends at terminal 406, which may be a return to a higher-level calling program. If BESTG is nonnegative, the operation loop 407–410 actually interchanges the subsets selected by subroutine SELECT and begins another iteration through the process by returning to operation block 403.

Figure 5:
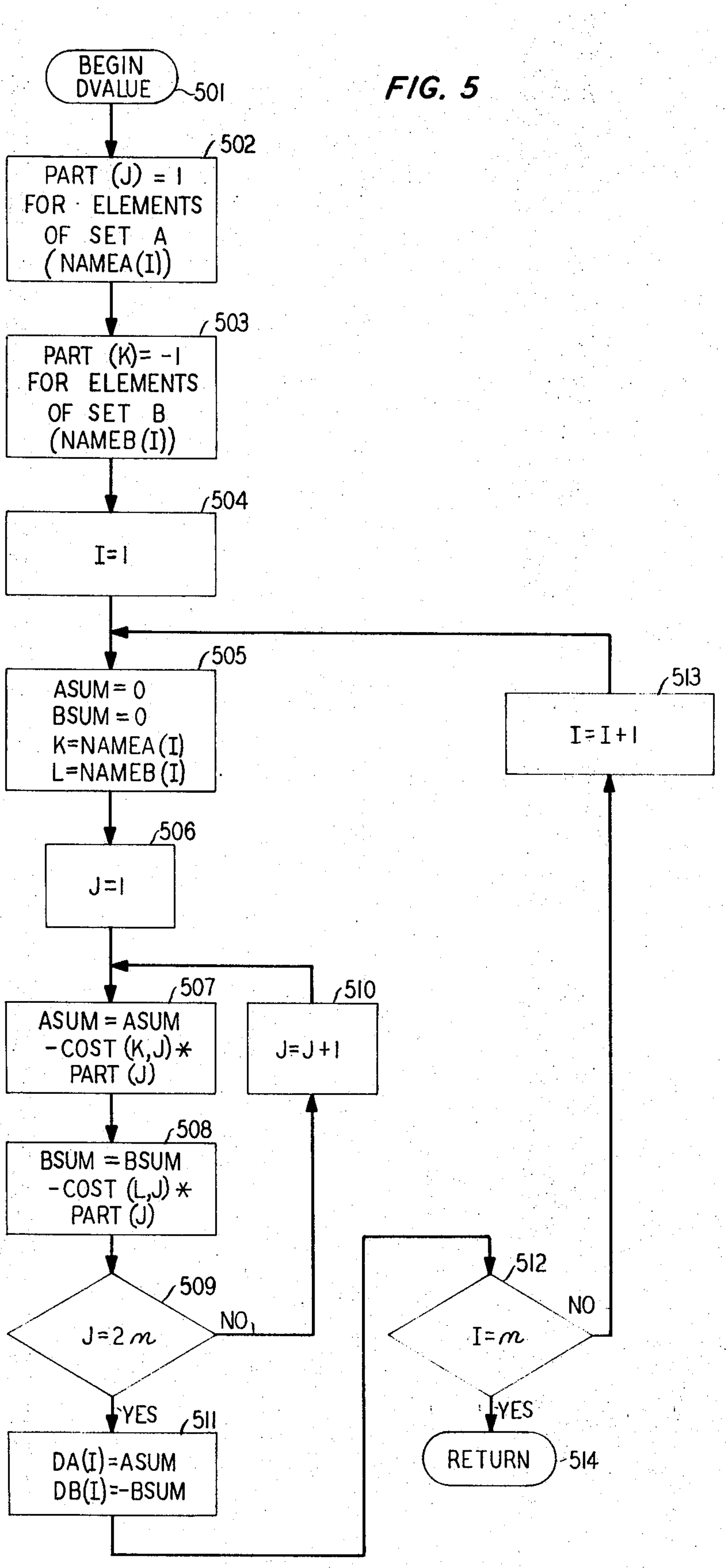
FIG. 5 is a flow chart of subroutine DVALUE which illustrates a particular sequence of steps of the novel process.

Subroutine DVALUE, shown in FIG. 5 and on pages A3 and A4, computes the D values for the partition specified by the contents of the NAMEA and NAMEB arrays, which contain the elements currently comprising sets A and B, respectively. DVALUE begins at terminal 501 and creates a vector "PART" in operation blocks 502 and 503. PART (I) is a 1 if element I is in set A, and a −1 if element I is in set B. Blocks 504–506 serve to initialize parameters used in operational loops 505–513 and 507–510. Loops 507–510 and 505–513 compute the actual D values in accordance with equations (4), (5), and (6). Loop 505–513 picks up the elements of sets A and B one at a time, and loop 507–510 sums across the appropriate row of the cost matrix for each element picked by loop 505–513. The values so computed are stored in vectors DA and DB by block 511. When all the D values have been computed, the process returns to the calling program by exiting through terminal block 514.

Figure 6A:
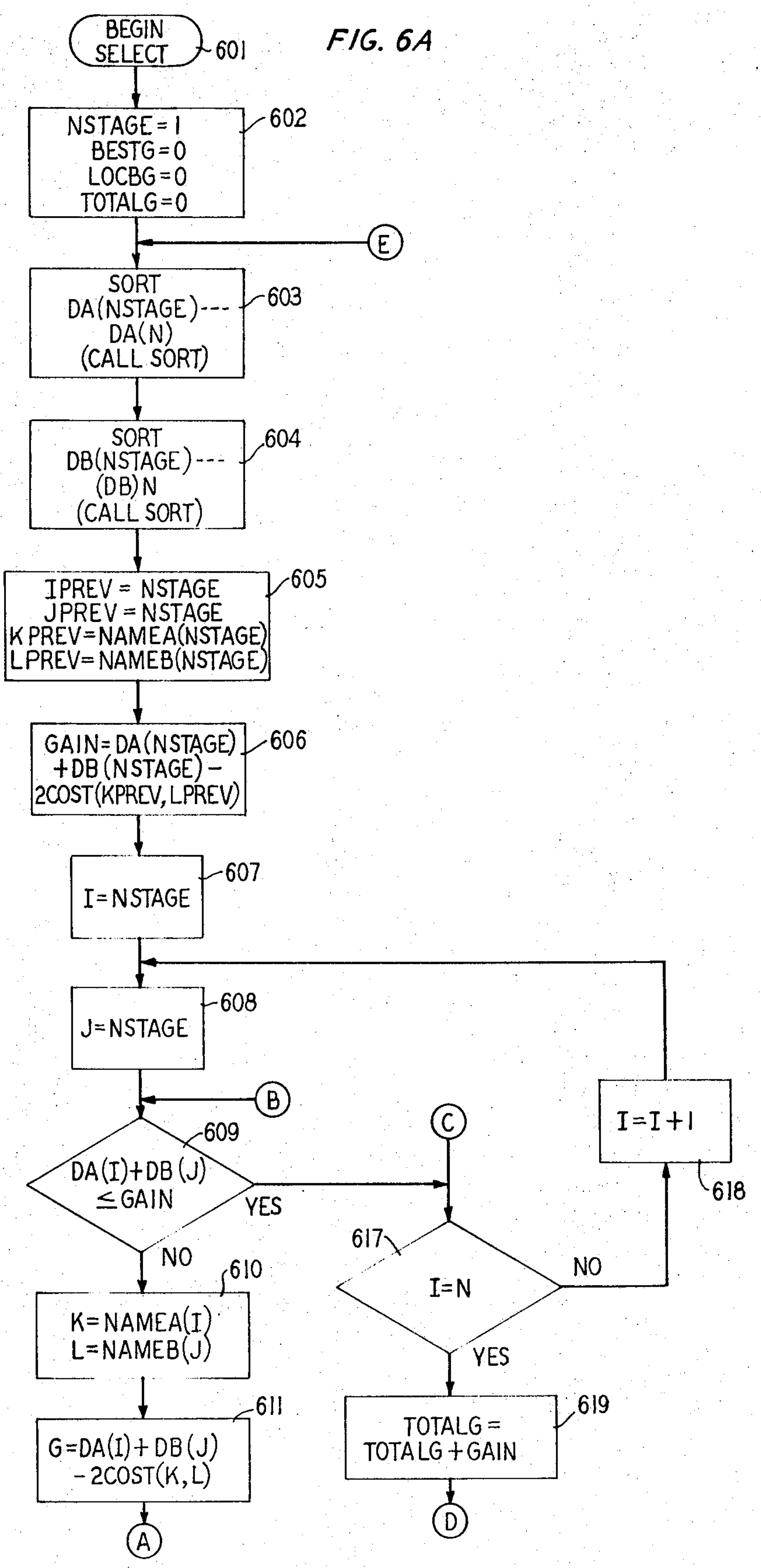
FIGS. 6A, 6B, and 6C are flow charts of subroutine SELECT which illustrate a particular sequence of steps of the novel process.
Figure 6B:
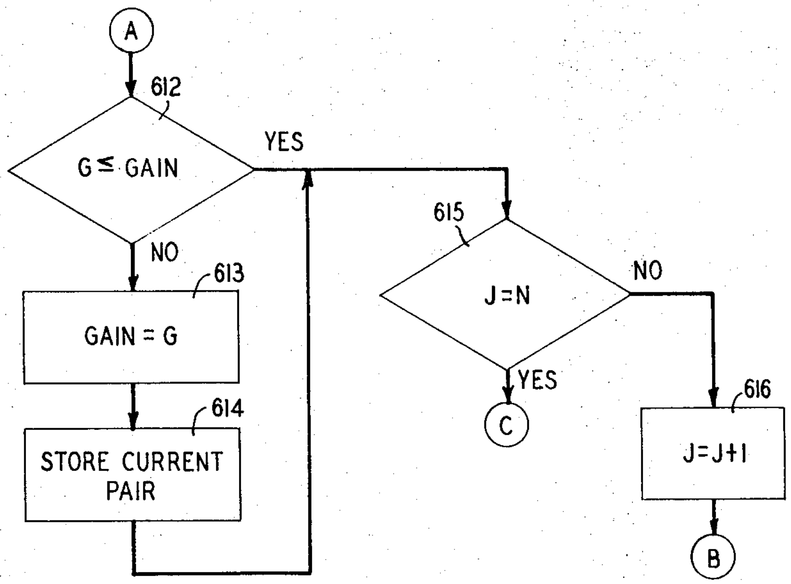
Figure 6C:
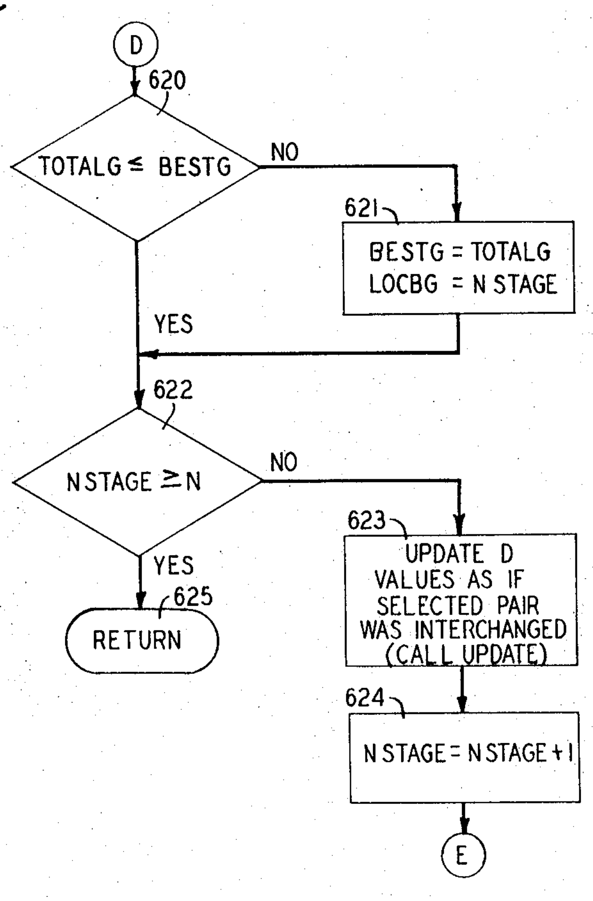

Subroutine SELECT, shown in FIGS. 6A, 6B, and 6C, and on pages A5, A6, and A7, selects the two subsets which must be interchanged to give the best gain at any pass through the process. SELECT begins at terminal 601 and performs the parameter initialization shown in block 602 of FIG. 6A. The D values that remain at the current pass are sorted by calling subroutine SORT as indicated in operation blocks 603 and 604. As will be discussed later, this operation also sorts the corresponding NAMEA and NAMEB values.

The search for the largest gain is begun in blocks 605 and 606 by applying equation (7) to the first elements in the DA and DB lists. Block 607 initializes operational loop 608–616 which searches for a sum DA(I)+DB(J) that is greater than the value of gain previously computed. If such a sum is found it indicates that perhaps there is a larger gain, G, to be obtained. Block 611 computes the exact value of this gain, including the effect of the connection, if any, between the elements being considered. If G is in fact larger than the previous gain, loop 612–614, shown in FIG. 6B, substitutes this value for the previous value and the process continues to look at the elements of the DA and DB lists for a still greater gain.

Note that loop 609–616 runs through all elements of list DB for each element of list DA chosen by loop 608–618. This search terminates in one of two ways. If a pair DA(I)+DB(J) is ever found less than or equal to the current value of GAIN, conditional branch point 609 will transfer to block 617. After all sums DA(I)+DB(J) have been examined conditional branch point 617 will transfer to block 619.

Operation block 619 in combination with the flow chart of FIG. 6C keeps track of the partial sum of gains in accordance with equation (15). When a maximum value is found, it is stored along with the pairs that must be interchanged to achieve it, as shown by block 621. If there are any elements remaining in lists DA and DB, conditional branch point 622 transfers control to block 623 which calls subroutine UPDATE to recompute the remaining D values relative to the elements that have been selected for interchange. A counter, NSTAGE, which keeps track of the number of unselected pairs of elements, is advanced, and the subroutine transfers to block 602 to process the remaining pairs. When all pairs have been processed, conditional branch point 622 transfers control to terminal 625 which returns to the calling program.

Figure 7:
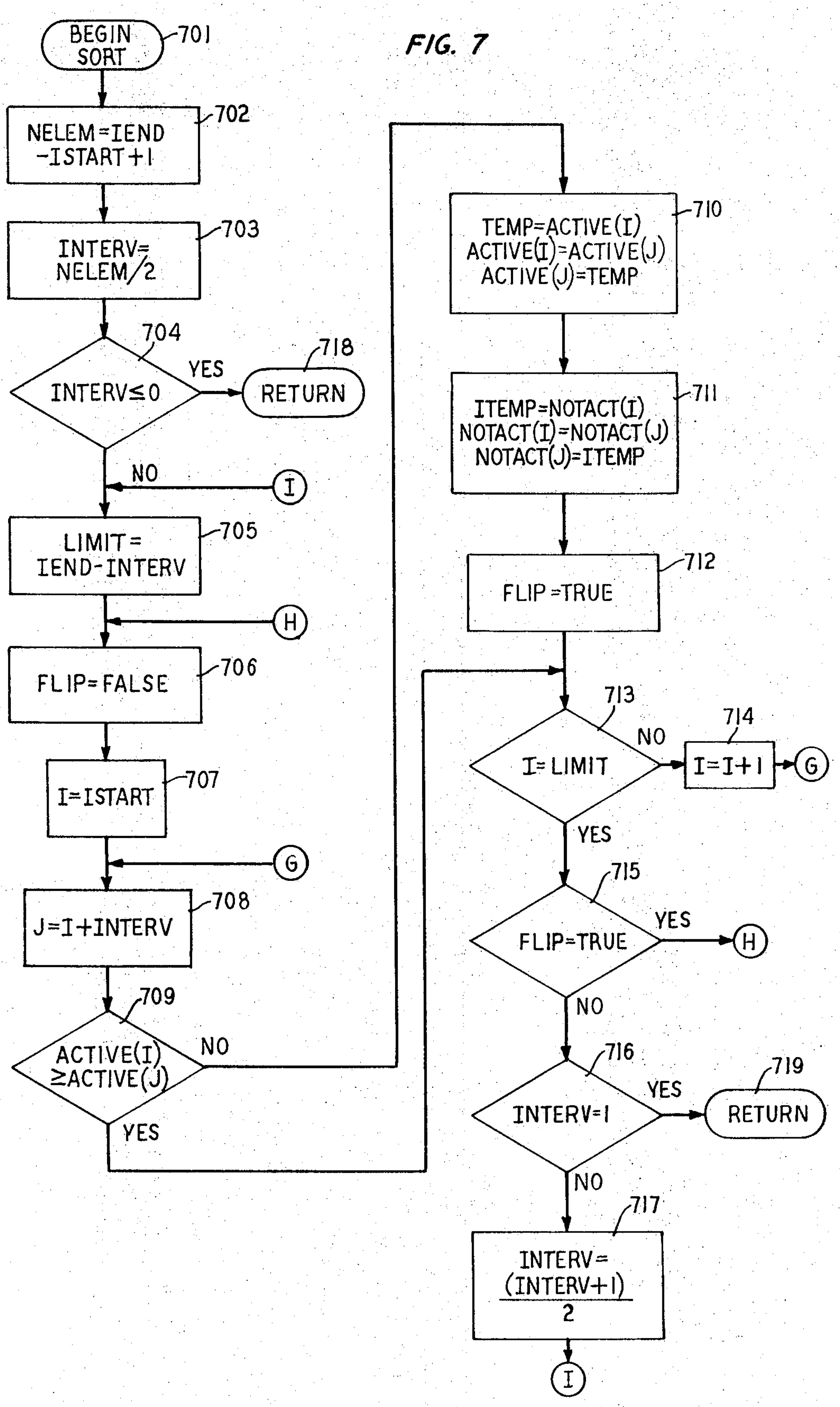
FIG. 7 is a flow chart of subroutine SORT which illustrates a particular sequence of steps of the novel process.

Subroutine SORT, shown in FIG. 7 and on pages A8 and A9, sorts the D values in the manner shown in equations (11) when called by subroutine SELECT. There are many sorting procedures well known to those skilled in the art and any one of them may be used. The particular one chosen here is both simple and rapid. It is commonly termed the "Shell sort," named for the man who developed it. A further description of it may be found in the article by D. L. Shell entitled "A High Speed Sorting Procedure," and published in *Communications of the Association for Computing Machinery*, Volume 2, number 7, July 1959, pages 30–32.

Subroutine SORT sorts the list of D values, called "ACTIVE" in the flow chart of FIG. 7, into a list of descending order of magnitude and reorders the list of corresponding set elements, called "NOTACT" in the flow chart of FIG. 7, in the same manner. SORT begins at terminal 701 and first computes, as shown in block 702, the length of the list to be sorted using values supplied by the routine that called it. Block 703 establishes the length of the search interval. If this interval is greater than zero, conditional branch point 704 transfers control to block 705, otherwise the subroutine returns to the calling program at terminal 718. Block 705 establishes a limiting value used by the subroutine to define the length of a particular pass. Block 706 creates a flag, FLIP, used to indicate whether an interchange of elements has taken place during a particular pass through the set being sorted, that is, the ACTIVE list.

Loop 707–714 goes through the ACTIVE list testing to see if elements at positions in the list separated by the current value of INTERV are in the correct order. If they are not in the correct order they are interchanged and FLIP is set to TRUE to record that an exchange was performed in the current pass.

Loop 705–717 serves to divide the search interval in half each time loop 707–714 finishes sorting the list. When the interval has been reduced to one and all the elements have been correctly reordered, the subroutine returns to the calling routine by means of terminal 719.

Figure 8:
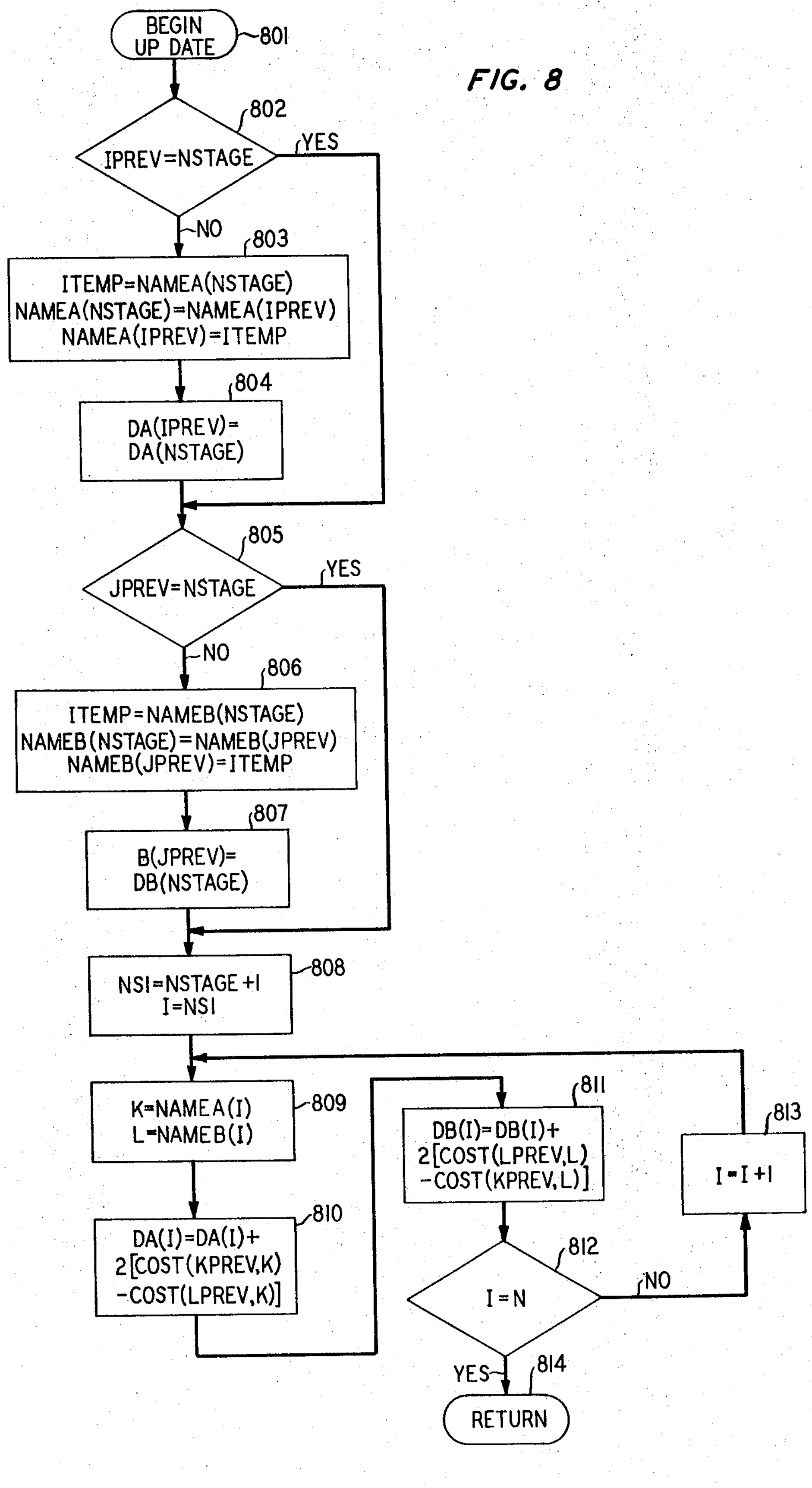
FIG. 8 is a flow chart of subroutine UPDATE which illustrates a particular sequence of steps of the novel process.

Subroutine UPDATE, shown in FIG. 8 and on page A10, removes from further consideration the pair of elements selected by subroutine SELECT and recomputes the D values of the remaining elements. The subroutine basically serves to move a pointer, NSTAGE, down the set of elements and their associated D values. This pointer defines the initial element of the set currently under consideration and each time it is incremented the size of the set being considered decreases by one element.

The subroutine begins at terminal 801 and its first action conditional branch point 802, is to check whether the element in set A that was selected by subroutine SELECT is already at the head of the list. If it is not, blocks 803 and 804 move it to the head of the NAMEA list and move its D value to the head of the DA list. Conditional branch point 805 and blocks 806 and 807 do the same thing for the element of set B that was selected. Block 808 then advances the pointer to redefine the sets to be further examined. Loop 809–813 recomputes the D values for the remaining elements in accordance with equations (12), and the subroutine returns to the calling routine by means of terminal 814.

One of the objects of the invention was that the process be efficient and not overly dependent upon the number of elements being partitioned, since a process whose running time grows exponentially or factorially with the number of elements would not be practical. The following reasoning will show that the running time of the digital computer program used in practicing the novel process disclosed herein grows approximately as the square of the number of elements being partitioned.

A pass may be defined to be the operations involved in making one cycle of identification of pairs $(a_1', b_1')$, ..., $(a_n', b_n')$ and selection of sets X and Y to be exchanged. The total time for a pass may be estimated this way. First, the computation of the D values initially is an $n^2$ process. This is true because for each element of S, all the other elements of S must be considered. The time required for updating the D values is proportional to the number of values to be updated, so the total updating time in one pass grows as shown in equation (22*a*).

$$(n-1)+(n-2)+\ldots+2+1 \propto n^2 \quad (22)$$

The dominant time factor is the selection of the pair $(a_1', b_1')$ to be next interchanged. The first step in this selection is the sorting of the D values, which is an $n \log_2 n$ operation. The time required to sort the D values in a pass is approximately $$n \log_2 n+(n-1)\log_2(n-1)+\ldots+2\log_2 2 \propto n^2 \log_2 n \quad (23)$$

The actual experimental results obtained during actual use of the process indicates an apparent growth rate of about $n^{2.4}$, which is reasonably in accordance with the predicted value.

The efficiency of the process can be best appreciated by comparing its $n^2$ growth rate with the time that would be required for the examination and evaluation of all pairs of sets X and Y which is shown in equation (24).

$$\left.\begin{array}{r}\text{Running time to}\\ \text{examine all pairs}\end{array}\right\} \propto n^2 \sum_{k=1}^{n/2} \binom{n}{k}^2 \quad (24)$$

Equation (24) may be approximated by equation (25)

$$n^2 \sum_{k=1}^{n/2} \binom{n}{k}^2 \approx n^{3/2} 4^n \quad (25)$$

which can be seen to be a much larger growth rate than $n^{2.4}$.

Finally, it should be noted that although the locally optimum process was initially developed in response to the problem of assigning circuit components to supporting structures so as to minimize the interconnection cost, the process is not limited to this use. The process is useful for dividing any interconnected items into sets so as to minimize the connections between sets. It is understood that such other uses and the accompanying changes and modifications in the locally optimum process may be made without departing from the spirit and scope of the invention as set forth in the appended claims.

APPENDIX A

```
      SUBROUTINE OPT
C
C           THIS SUBROUTINE IS THE MAIN ROUTINE FOR
C           THE OPTIMIZATION PROCEDURE.
C
C           IT ASSUMES THAT THE TWO SETS (A AND B)
C           ARE BOTH OF SIZE N, WITH NAMES STORED
C           IN THE ARRAYS "NAMEA" AND "NAMEB".
C
C           WHEN IT RETURNS, THE SETS IN NAMEA
C           AND NAMEB  HAVE BEEN PARTITIONED
C           OPTIMALLY WITH RESPECT TO THE PROCEDURE.
C
C
C           THIS SECTION CONTAINS THE COMMON DATA BASE
C           FOR ALL THE SUBROUTINES  OF THE PARTITIONING
C           PROGRAM.
C           A COPY IS USED IN EACH OF
C               OPT, SELECT, DVALUE, UPDATE
C
C
C           "PARTIT"
C
C           COMMON BLOCK FOR PARTITION DATA.
C
C           NAMEA  AND  NAMEB  CONTAIN THE NAMES
C           OF ELEMENTS IN THE  A  AND  B  SETS
C           RESPECTIVELY.
C           THE NAMES ARE THE INTEGERS BETWEEN  1  AND  2N.
C
C           DA  AND  DB  CONTAIN THE CORRESPONDING
C           D VALUES.
C
C           N  IS THE NUMBER OF ELEMENTS IN EITHER SET.
C
C
      COMMON /PARTIT/NAMEA(50),NAMEB(50) ,DA(50),DB(50),N
C
C           "CMATRX"
C
C           COMMON BLOCK FOR MATRIX OF CROSS CONNECTION
C           COSTS.
C
C           THIS WILL DEPEND ON ACTUAL IMPLEMENTATION OF
C           DATA BASE.
C
      COMMON /CMATRX/ COST(50,50)
C
C
      ISTART = 1
C
C
C           COMPUTE THE D VALUES FOR THE
C           CURRENT PARTITION, USING EQUATION (6).
C
  100 CALL DVALUE
C
C           FIND THE BEST SETS TO BE
C           INTERCHANGED
C
```

APPENDIX A

```
      CALL SELECT(BESTG,LOCBG)
C
C           IS THE BEST GAIN POSITIVE?
C           IF YES, LOOP BACK AND TRY AGAIN
C           WITH THE NEW PARTITION
C           IF NO, TERMINATE
C
      IF(BESTG .LE. 0.0) GO TO 200
C
C           YES, SO TRY FOR A FURTHER GAIN.
C           FIRST INTERCHANGE THE SUBSETS WHICH
C           GAVE THE BEST IMPROVEMENT.
C
      DO 150 I = ISTART,LOCBG
      ITEMP    = NAMEA(I)
      NAMEA(I) = NAMEB(I)
      NAMEB(I) = ITEMP
  150 CONTINUE
C
C           NOW REPEAT
C
      GO TO 100
C
C
C           THIS IS THE EXIT FOR THE OPTIMIZING ROUTINE...
C
  200 RETURN
      END
```

APPENDIX A Page A-3

```
      SUBROUTINE DVALUE
C
C
C         COMPUTES THE DVALUES FOR ALL ELEMENTS,
C         FOR THE PARTITION SPECIFIED BY THE CONTENTS
C         OF "NAMEA" AND "NAMEB" ARRAYS.
C
C         THE D VALUE FOR ANY ELEMENT  A(I), IN
C         ACCORDANCE WITH EQUATIONS (4), (5), AND (6),
C         IS THE SUM OF ALL CONNECTIONS BETWEEN A(I) AND
C         ELEMENTS IN B, MINUS THE SUM OF ALL
C         CONNECTIONS BETWEEN A(I) AND ELEMENTS OF  A.
C
C
C         COMMON BLOCK
C
      COMMON/PARTIT/NAMEA(50),NAMEB(50),DA(50),DB(50),N
      COMMON /CMATRX/ COST(50,50)
C
C
C         CREATE A VECTOR "PART"  SUCH THAT PART(I)
C         IS  1  IF THE I-TH ELEMENTS IS IN  A,
C         AND  -1  IF THE ELEMENT IS IN  B.
C
C         THE SIZE OF THIS VECTOR MUST BE AT LEAST 2N.
C
C
      DIMENSION PART(100)
C
C
      DO 10 I = 1, N
      J = NAMEA(I)
      PART(J) = 1.0
      K = NAMEB(I)
      PART(K) = -1.0
   10 CONTINUE
C
C         NOW COMPUTE THE D VALUES
C
      DO 30 I = 1, N
C
C         INITIALIZE SUMS TO ZERO
C
      ASUM = 0.0
      BSUM = 0.0
C
C         GET THE ACTUAL NAMES OF THE ELEMENTS
C
      K = NAMEA(I)
      L = NAMEB(I)
C
C         NOW SUM  ACROSS A ROW OF THE COST MATRIX
C         FOR THE  A  SET, SUBTRACT  COST(-,-) IF THE
C         ELEMENT IS IN  A, AND ADD (SUBTRACT A
C         NEGATIVE VALUE) IF ELEMENT IS IN  B.
C
C         FOR THE  B  SET, DO THE SAME, AND REVERSE
C         THE ANSWER WHEN FINISHED.
C
      NN = 2 * N
      DO 20 J = 1, NN
      ASUM = ASUM - COST(K,J) * PART(J)
```

APPENDIX A Page A-4

```
      BSUM = BSUM - COST(L,J) * PART(J)
   20 CONTINUE
C
C         RECORD THESE VALUES.
C         CHANGE SIGN OF DB.
C
C
      DA(I) = ASUM
      DB(I) = - BSUM
   30 CONTINUE
C
C         DONE...
C
      RETURN
      END
```

APPENDIX A Page A-5

```
      SUBROUTINE SELECT(BESTG,LOCBG)
C
C
C         THIS SUBROUTINE SELECTS THE TWO SUBSETS
C         WHICH MUST BE INTERCHANGED TO GIVE THE
C         BEST GAIN AT ANY PASS OF THE PROCEDURE.
C
C
C
C
C         COMMON BLOCK
C
      COMMON/PARTIT/NAMEA(50),NAMEB(50),DA(50),DB(50),N
      COMMON /CMATRX/ COST(50,50)
C
C
C         INITIALIZATION OF PARAMETERS, COUNTERS, ETC.
C
C
C              NSTAGE IS THE NUMBER OF ELEMENTS IN THE
C              SUBSETS WHICH WE ARE CONSIDERING.  IT
C              STARTS AT 1 AND RUNS TO N.
C              BESTG  IS THE BEST GAIN POSSIBLE AT ANY
C              STAGE;  LOCBG  IS THE VALUE OF  NSTAGE
C              FOR WHICH  BESTG  IS ACHIEVED.
C              TOTALG  IS A RUNNING TOTAL OF GAINS
C              ACHIEVED.  BESTG  IS THE ABSOLUTE MAXIMUM
C              VALUE THAT TOTALG  EVER ACHIEVES.
C
      NSTAGE = 1
      BESTG = 0.0
      LOCBG = 0
      TOTALG = 0.0
C
C         SORT ELEMENTS OF A SET FROM NSTAGE TO N
C         INTO DECREASING ORDER OF D VALUE.
C         THE NAMEA VECTOR IS REORGANIZED TO
C         REFLECT THIS CHANGE IN ORDERING
C
  100 CALL SORT(DA,NAMEA,NSTAGE,N)
C
C         DO THE SAME FOR THE B SET.
C
      CALL SORT(DB,NAMEB,NSTAGE,N)
C
C         SCAN DOWN THE DA AND DB ARRAYS
C         FROM NSTAGE TO  N, LOOKING FOR THE PAIR
C         OF ELEMENTS  I  AND  J  FOR WHICH THE
C         INTERCHANGE OF I AND  J GIVES MAXIMUM GAIN.
C
C
C         TO GET STARTED, SET THE BEST GAIN TO THAT
C         FOR THE FIRST ELEMENTS IN THE LISTS,
C         USING EQUATION (7).
C
      IPREV = NSTAGE
      JPREV = NSTAGE
      KPREV = NAMEA(NSTAGE)
      LPREV = NAMEB(NSTAGE)
C
C         "GAIN" IS THE VALUE ACHIEVED BY FLIPPING
C         THE FIRST ELEMENT OF EACH SET:
C
```

APPENDIX A Page A-6

```
      GAIN = DA(NSTAGE) + DB(NSTAGE)
     X         - 2.0 * COST(KPREV,LPREV)
C
C         NOW LOOK FOR A BETTER GAIN THAN THIS ONE
C
      DO 120 I= NSTAGE, N
      K= NAMEA(I)
      DO 110 J= NSTAGE, N
C
C         SEE IF ANY IMPROVEMENT IS POSSIBLE
C         FOR THIS VALUE OF I.
C         IF NOT, GO TO NEXT I VALUE.
C
      TEMP = DA(I) + DB(J)
      IF(TEMP .LE. GAIN) GO TO 120
C
C         PERHAPS AN IMPROVEMENT IS POSSIBLE,
C         SO TRY TO FIND THE BEST.
C     K = NAME A(I)
      L = NAMEB(J)
      G = TEMP - 2.0 * COST(K,L)
C
C         IF THIS IS SMALLER THAN "GAIN",
C         GO TO THE NEXT VALUE OF  J.
C
      IF(G .LE. GAIN) GO TO 110
C
C         FOUND SOMETHING BETTER.  REMEMBER WHERE
C         IT IS AND HOW BIG IT IS:
C         G  REPLACES CURRENT VALUE OF "GAIN".
C         K  AND  L  ARE THE NAMES OF ELEMENTS.
C         I  AND  J  ARE THEIR LOCATIONS IN
C         NAMEA  AND  NAMEB  RESPECTIVELY.
C
      GAIN = G
      IPREV = I
      JPREV = J
      KPREV = K
      LPREV = L
C
  110 CONTINUE
  120 CONTINUE
C
C         THEN COMPUTE THE TOTAL GAIN-AFTER NSTAGE
C         ELEMENTS HAVE BEEN FLIPPED, IN ACCORDANCE
C         WITH EQUATIONS (14) AND (15).
C         THIS IS THE RUNNING TOTAL.
C
      TOTALG = TOTALG + GAIN
C
C         IS THIS HIGHER THAT THE BEST GAIN
C         SEEN SO FAR?
C
      IF(TOTALG .LE. BESTG) GO TO 200
C
C         YES, SO RECORD THE VALUE, AND WHERE IT
C         OCCURRED.
C
      BESTG = TOTALG
      LOCBG = NSTAGE
C
C         IN ANY CASE, CONTINUE UNTIL N PAIRS
```

APPENDIX A Page A-7

```
C               HAVE BEEN SELECTED
C
 200   IF(NSTAGE  .GE. N) GO TO 300
C
C
C               NOT DONE YET,  SO
C               UPDATE THE D VALUES AS IF THE SELECTED
C               PAIR HAD ACTUALLY BEEN INTERCHANGED.
C               IN ACCORDANCE WITH EQUATIONS (12).
C
       CALL UPDATE(NSTAGE,  IPREV,JPREV,KPREV,LPREV)
C
C               INCREASE NSTAGE, AND GO BACK TO SELECT
C               THE NEXT PAIR OF  A  AND  B.
C
       NSTAGE = NSTAGE + 1
       GO TO 100
C
C               AT THIS POINT, ALL PAIRS HAVE BEEN EXAMINED.
C               WE KNOW THAT THE BEST GAIN IS "BESTG",
C               AND THAT IT CAN BE ACHIEVED BY
C               INTERCHANGING
C               NAMEA(1)...NAMEA(LOCBG)   WITH
C               NAMEB(1)...NAMEB(LOCBG)
C
 300   RETURN
       END
```

APPENDIX A Page A-8

```
      SUBROUTINE SORT(ACTIVE,NOTACT,ISTART,IEND)
C
C             THIS SORT IS A "SHELL SORT", A SIMPLE BUT
C             FAIRLY FAST SORTING PROCEDURE REQUIRING
C             ESSENTIALLY NO EXTRA SPACE.
C
C             REFERENCE:
C             SHELL, D. L.
C             A HIGH SPEED SORTING PROCEDURE.
C             COMMUNICATIONS OF THE ASSOCIATION FOR
C             COMPUTING MACHINERY,  VOLUME 2, #7,
C             JULY 1959, PAGES 30-32.
C
C
C             ANY SORTING PROCEDURE COULD BE USED.
C             THIS ONE IS VERY SIMPLE TO IMPLEMENT IN FORTRAN.
C
C
C             IN THIS IMPLEMENTATION, THE FIRST INPUT
C             ARGUMENT IS THE VECTOR ON WHICH THE SORT IS
C             TO BE PERFORMED.
C             THE SECOND ARGUMENT IS THE NAME OF A "PASSIVE"
C             VECTOR WHICH IS TO BE RE-ORDERED IN EXACTLY
C             THE SAME FASHION AS THE FIRST VECTOR;
C             IT HAS NO EFFECT ON THE SORTING ITSELF.
C             THE THIRD AND FOURTH ARGUMENTS ARE THE
C             POSITIONS OF THE FIRST AND LAST ELEMENTS OF THE
C             SUBSET OF THE VECTOR WHICH IS TO BE SORTED.
C
C             ASSUME THAT THE CONTROLLING VECTOR IS
C             FLOATING POINT,  AND THE PASSIVE IS INTEGER.
C
C
      DIMENSION ACTIVE(100), NOTACT(100)
C
C
      LOGICAL FLIP
C
C             FLIP IS A SWITCH THAT REMEMBERS WHETHER AN
C             INTERCHANGE HAS TAKEN PLACE DURING ANY ONE
C             PASS THROUGH THE ACTIVE VECTOR.
C             IT IS SET FALSE AT THE BEGINNING OF EACH
C             PASS THROUGH THE VECTOR.
C
C
C             COMPUTE THE NUMBER OF ELEMENTS TO BE SORTED.
C
      NELEM = IEND - ISTART + 1
C
C             COMPUTE 1/2 THIS VALUE (TRUNCATED) AS THE
C             INITIAL INTERVAL OF COMPARISON.
C
      INTERV = NELEM/ 2
C
C             IF LESS THAN TWO ELEMENTS, EXIT
C
      IF(INTERV .LE. 0) RETURN
C
C             SET AN UPPER LIMIT FOR THE LOOP, SO THAT
C             WE ONLY EXAMINE ELEMENTS BETWEEN "ISTART"
C             AND "IEND"
C
```

APPENDIX A Page A-9

```
 1    LIMIT = IEND - INTERV
C
C             SET FLIP TO FALSE AT START OF THE PASS
C
 2    FLIP = .FALSE.
C
C             NOW SCAN THROUGH ACTIVE VECTOR, COMPARING
C             ELEMENTS WHICH ARE DISTANCE "INTERV" APART.
C             IF THEY ARE ALREADY IN ORDER, LEAVE THEM
C             ALONE.
```

```
C             IF NOT, INTERCHANGE THEM, AND SET FLIP
C             TO TRUE, TO REMEMBER THAT AN EXCHANGE TOOK
C             PLACE.
C
      DO 10 I = ISTART, LIMIT
      J = I + INTERV
C
C             ALREADY IN ORDER? (SORTING IN DESCENDING ORDER)
C
      IF(ACTIVE(I) .GE. ACTIVE(J)) GO TO 10
C
C             NO, SO FLIP THEM AROUND
C
      TEMP = ACTIVE(I)
      ACTIVE(I) = ACTIVE(J)
      ACTIVE(J) = TEMP
C
C             ALSO FLIP THE NON-ACTIVE ONES
C
      ITEMP = NOTACT(I)
      NOTACT(I) = NOTACT(J)
      NOTACT(J) = ITEMP
C
C             REMEMBER THE FLIP
C
      FLIP = .TRUE.
C
 10   CONTINUE
C
C             WERE THERE ANY EXCHANGES?
C             IF SO, HAVE TO MAKE ANOTHER PASS THROUGH WITH
C             THIS VALUE OF THE INTERVAL
C
      IF(FLIP) GO TO 2
C
C             NO INTERCHANGES.  WAS THE INTERVAL = 1?
C             IF SO, THEN EVERYTHING WAS IN ORDER,
C             AND WE ARE DONE.
C
      IF(INTERV .EQ. 1) GO TO 100
C
C             NO, SO RESET THE INTERVAL TO 1/2 ITS
C             CURRENT VALUE (ROUNDED UP), AND
C             REPEAT THE PROCESS.
C
      INTERV = (INTERV + 1) / 2
      GO TO 1
C
C             DONE...
C
 100  RETURN
      END
```

APPENDIX A Page A-10

```
      SUBROUTINE UPDATE(NSTAGE,  IPREV,JPREV,KPREV,LPREV)
C
C             AFTER KPREV AND LPREV HAVE BEEN SELECTED
C             AS THE NEXT PAIR TO BE INTERCHANGED, THEY
C             ARE MOVED TO THE POSITIONS "NAMEA(NSTAGE)"
C             AND "NAMEB(NSTAGE)" TO REMOVE THEM FROM
C             FURTHER CONSIDERATION, AND ALL REMAINING
C             ELEMENTS HAVE THEIR D VALUES UPDATED.
C             THIS COMPUTATION USES EQUATIONS (12).
C
C
C             COMMON BLOCK
C
      COMMON/PARTIT/NAMEA(50),NAMEB(50),DA(50),DB(50),N
      COMMON /CHATRX/ COST(50,50)
C
C
C             INTERCHANGE NAMEA(IPREV) AND NAMEA(NSTAGE)
C             UNLESS ALREADY IN POSITION
C
      IF(IPREV .EQ. NSTAGE) GO TO 100
      ITEMP = NAMEA(NSTAGE)
      NAMEA(NSTAGE) = NAMEA(IPREV)
      NAMEA(IPREV) = ITEMP
C
C             KEEP THE DVALUE TOO
C
      DA(IPREV) = DA(NSTAGE)
C
C             SAME FOR B SET, UNLESS ALREADY
C             IN POSITION
C
 100  IF(JPREV .EQ. NSTAGE) GO TO 200
      ITEMP = NAMEB(NSTAGE)
      NAMEB(NSTAGE) = NAMEB(JPREV)
      NAMEB(JPREV) = ITEMP
      DB(JPREV) = DB(NSTAGE)
C
C             NOW COMPUTE NEW D VALUES FOR OTHER ELEMENTS,
C             USING EQUATIONS (12).
C
 200  NS1 = NSTAGE + 1
      DO 300 I = NS1, N
      K = NAMEA(I)
      L = NAMEB(I)
      DA(I) = DA(I) + 2.0 * (COST(KPREV,K)-COST(LPREV,K))
      DB(I) = DB(I) + 2.0 * (COST(LPREV,L)-COST(KPREV,L))
 300  CONTINUE
C
C             DONE...
C
      RETURN
      END
```

What is claimed is:

1. The method of determining the placement of a first plurality of electrical circuit components upon a second plurality of supporting structures subject to a known criteria of interconnection cost by performing the steps of:

1. reading into the memory of a digital computer digital representations of said first plurality of electrical circuit components;
2. dividing said digital representations into an initial partition comprising a plurality of sets, each of said sets representing one of said second plurality of supporting structures;
3. choosing a first set and a second set from said plurality of sets;
4. computing the cost of interconnections between said digital representations contained in said first set and said digital representations contained in said second set;
5. computing for each particular digital representation contained in said first and second sets the change in said interconnection cost that would result from transferring said particular digital representation between first and second sets;
6. transferring between said first and second sets the particular digital representations in each of said first and second sets that produce the largest negative change in said interconnection cost;
7. substituting the sets resulting from said transfer for said first and second sets;
8. repeating steps (4) through (7) until no further negative changes in said interconnection cost result; and
9. repeating steps (3) through (8) for all possible pairs of said plurality of sets of said initial partition.

2. The method of claim 1 wherein components requiring $k$ units of area, where $k$ is greater than 1, on said supporting structures are represented by $k$ digital representations having arbitrarily high interconnection costs.

3. The method of operating a data processing machine to partition the vertices of a graph having $k$ vertices into $m$ sets so as to minimize the interconnection cost between said sets comprising the steps of:

1. dividing said $k$ vertices into $m$ initial sets;
2. choosing two initial sets from said $m$ initial sets;
3. computing the decrease in the interconnection cost between said two initial sets (the gain) that would result from interchanging the first vertex of each of said two initial sets;
4. sequentially computing the gain that would result from interchanging other pairs of vertices of said two initial sets;
5. removing from further consideration the pair of vertices found by step (4) to produce the largest value of gain when interchanged;
6. storing said largest value of gain found in step (4);
7. repeating steps (3) through (6) until all of said pairs of vertices have been removed from further consideration by step (5);
8. computing the maximum partial sum that can be formed from said values stored in step (6);
9. performing those pairwise exchanges between said two initial sets required to achieve said maximum partial sum computed in step (8);
10. substituting said sets formed in step (9) for said two initial sets and repeating steps (3) through (9) until said maximum partial sum computed in step (8) is less than or equal to zero;
11. repeating steps (2) through (10) for all possible pairs of said $m$ initial sets; and
12. repeating steps (2) through (11) until no further improvement can be made between any possible pair of said $m$ initial sets.

4. The method of claim 3 wherein each set in the final partition is restricted to contain at least $n_0$ and at most $n_1$ vertices, where $mn_0 \leq k \leq mn_1$, by performing the additional steps of:

1. adding $mn_1-k$ dummy vertices to said graph prior to performing step (1) of said claim 3, said dummy vertices having no interconnections whatsoever;
2. performing step (1) of claim 3 such that the number of elements in each of said $m$ initial sets is equal to $n_1$; and
3. discarding said dummy vertices from the final partition resulting from step (12) of said claim 3.

5. The method of claim 3 wherein each set in the final partition is restricted to contain at least $n_0$ and at most $n_1$ vertices, where $mn_0 \leq k \leq mn_1$, by performing the additional steps of:

1. performing step (1) of claim 3 such that each of the initial $m$ sets contains at least $n_0$ and at most $n_1$ vertices; and
2. restricting the number of pairwise exchanges performed in step (9) of said claim 3 to be less than or equal to $n_0$.

6. The method of claim 3 wherein the interconnection cost of the final partition may be decreased by performing the additional steps of:

1. adding a plurality of dummy vertices to said graph prior to performing step (1) of said claim 3, said dummy vertices having no interconnections whatsoever;
2. performing all of the steps of said claim 3;
3. determining whether step (2) has resulted in the generation of at least one set containing all dummy vertices;
4. adding more dummy vertices and repeating steps (1) through (3) if at least one set containing dummy vertices has not been generated; and
5. discarding all of said dummy vertices if at least one set containing dummy vertices has been generated.

7. The method of claim 3 where $k$ is equal to $2n$ and $m$ is equal to 2.

8. The method of minimizing the interconnection cost between physically separated sets of related components comprising the steps of:

1. arbitrarily dividing all of said components into at least two initial sets;
2. determining the cost of the interconnections between said two initial sets;
3. determining the reduction in interconnection cost resulting from each pairwise interchange between two initial sets;
4. removing from consideration that pair producing the greatest reduction in interconnection cost;
5. repeating steps (2) through (4) until all of said pairs have been removed from consideration; and
6. performing those pairwise interchanges required to achieve the maximum reduction in interconnection cost.

9. The method of operating a data processing machine to partition the vertices of a graph having $k$ vertices into $m$ sets so as to minimize the interconnection cost between said sets comprising the steps of:

1. dividing said $k$ vertices into $m$ initial sets;
2. choosing two initial sets from said $m$ initial sets;
3. computing the decrease in the interconnection cost between said two initial sets (the gain) that would result from interchanging other pairs of vertices of said two initial sets;
4. sequentially computing the gain that would result from interchanging other pairs of vertices of said two initial sets;
5. removing from further consideration the pair of vertices found by step (4) to produce the largest value of gain when interchanged;
6. storing said largest value of gain found in step (4);
7. repeating steps (3) through (6) until all of said pairs of vertices have been removed from further consideration by step (5);
8. computing the maximum partial sum that can be formed from said values stored in step (6);
9. performing those pairwise exchanges between said two initial sets required to achieve said maximum partial sum computed in step (8);
10. substituting said sets formed in step (9) for said two initial sets and repeating steps (3) through (8) until said maximum partial sum computed in step (8) is less than or equal to zero;

11. repeating steps (2) through (10) for all possible pairs of said *m* initial sets;
12. repeating steps (2) through (11) until no further improvement can be made between any possible pair of said *m* initial sets;

13. dividing the *m* sets produced by step (11) into *t* sets;
14. choosing two initial sets from said *t* sets;
15. repeating steps (3) through (10) for all possible pairs of said *t* sets;
16. recombining said *t* sets into *m* sets;
17. repeating steps (2) through (12).

* * * * *